United States Patent [19]

Frisbee et al.

[11] Patent Number: 5,186,295
[45] Date of Patent: Feb. 16, 1993

[54] TRACTOR PEDAL ARRANGEMENT WITH ANTI-DECLUTCHING FEATURE

[75] Inventors: Claude M. Frisbee, Schofield; Ronald L. Sealine, Rothschild; Ronald H. Werner, Edgar, all of Wis.

[73] Assignee: Case Corporation, Racine, Wis.

[21] Appl. No.: 837,732

[22] Filed: Feb. 19, 1992

[51] Int. Cl.$^5$ .............................................. B60K 41/24
[52] U.S. Cl. .................. 192/13 R; 74/478.5; 74/480 R
[58] Field of Search ............ 192/13 R; 74/478, 478.5, 74/480 R; 180/6.7

[56] References Cited

U.S. PATENT DOCUMENTS

| | | | |
|---|---|---|---|
| Re. 29,293 | 7/1977 | Ehlke et al. | 192/13 R |
| 3,494,449 | 2/1970 | Umeda et al. | 74/478.5 X |
| 3,815,697 | 6/1974 | Bridwell et al. | 180/6.2 |
| 3,935,932 | 2/1976 | Moorhouse | 192/13 R |
| 4,441,596 | 4/1984 | Nakahara et al. | 192/13 R |

Primary Examiner—Richard Lorence
Attorney, Agent, or Firm—Jansson & Shupe, Ltd.

[57] ABSTRACT

The invention is an improvement in a vehicular clutch and brake control system, well suited for use on a crawler tractor. The system is of the type having a pair of primary pedals each controlling both clutch and brake operation for one track. The improvement includes an auxiliary pedal moving a hinge-mounted clevis to which a swinging link is pivotably mounted. In one operating mode (using only one or both primary pedals), either or both tractor tracks are de-clutched prior to brake application. In another mode, depression of the auxiliary pedal simultaneously depresses both primary pedals and track de-clutching is prevented even though both track brakes are applied. The operator is thereby better able to maintain control of the tractor in operating environments such as steep hills, embankments, foundation back-filling and the like.

8 Claims, 6 Drawing Sheets

TRACTOR PEDAL ARRANGEMENT WITH ANTI-DECLUTCHING FEATURE

FIELD OF THE INVENTION

This invention is related generally to vehicular clutch and brake control systems and, more particularly, to such systems of the type having a primary pedal that controls both clutch and brake operation.

BACKGROUND OF THE INVENTION

Crawler tractors include an engine and engine-driven transmission controllably coupled to each of the crawler tracks through a drive sprocket. The transmission generally has two hydraulically-operated clutches, one for each track. When a clutch is engaged, its track is powered and, when disengaged (or "de-clutched"), its track is free to "coast" as the tractor coasts or under the urging of the other track if the latter is still engaged with the transmission. Vehicles of this type typically have a primary pedal per track that controls both clutch and brake operation on that track.

Previous clutch and brake control systems have provided for the engagement or disengagement of each clutch by a clutch valve operated by a predetermined hydraulic pressure in the master cylinder of the corresponding brake. Consequently, depression of the left or right brake pedal would cause application of the brake and at some predetermined master cylinder pressure, the corresponding transmission valve would be shifted to the de-clutch position.

Numerous disadvantages are present in the devices of the prior art. One of the principal and most widely-recognized problems of such devices is that they are not well-equipped to handle particular operating conditions where control of or prevention of vehicle coasting is critical.

For example, when the crawler tractor is being used on a steep slope or near a precipice-like embankment, clutch disengagement prior to significant brake application could allow coasting and pose a danger to the operator and to the tractor. On a steep slope, it would be advantageous for the operator to have both driving power and braking, the latter applied with sufficient force to prevent the tractor from rolling down the hill. When working near a steep embankment or when backfilling a foundation, good control is required to "inch" the vehicle up to the embankment or trench while at the same time avoiding running the tractor over the edge. In such operating environments, operators of crawler tractors like to be able to "drive through the brakes."

A second disadvantage of the devices of the prior art is that the brake master cylinder pressure (at which de-clutching occurs) is not readily adjustable. A way to adjust braking relative to de-clutching and as a function of pedal travel would be advantageous since degrees of vehicle coasting (if any) or "driving through the brakes" could be selected in view of the type of work being performed by the tractor.

There is a long-standing need for a clutch and brake control system whereby if required, the brakes can be applied without the loss of power which occurs when the track on either side is de-clutched. There is also a long-standing need for a device whereby brake application (relative to pedal position and de-clutching) can be readily adjusted for each track.

These needs are fulfilled by the present invention which is a clutch and brake control system permitting brake application while the crawler tracks are being powered. The present invention also allows limited adjustment of the pedal position at which brake application starts to occur relative to declutching.

OBJECTS OF THE INVENTION

It is an object of this invention to provide a safer and more "operator-friendly" clutch and brake system for vehicles having a primary pedal which controls both clutch and brake operation.

Another object of this invention is to provide a braking system whereby in one operating mode, the brakes may be applied without de-clutching.

A further object of the invention is to provide a system which permits the vehicle operator to coast or drive through the brakes, as required in the circumstances.

Another object of this invention is to provide, in another operating mode, means for readily adjusting brake application with respect to pedal travel and de-clutching.

These and other important objects will be apparent from the descriptions of this invention which follow.

SUMMARY OF THE INVENTION

This invention is an improvement of a vehicular clutch and brake control system of the type whereby each of two primary pedals operates both clutch and brake functions. It is particularly useful on a crawler tractor having tracks individually powered by the engine and a torque-converter transmission. The invention allows the vehicle operator to prevent de-clutching as the brakes are applied, even to the point of stopping the vehicle without de-clutching. In that way, full driving or braking control of the vehicle is maintained on, for example, a steep hill. It is to be appreciated that a torque-converter transmission permits the vehicle to be fully stopped without de-clutching. In this way, it is similar to the automatic transmission of a passenger auto.

The inventive improvement comprises a clevis hinge-mounted at one end to permit the clevis to "swing" or pivot through a limited arc of movement. A link is pivotably mounted at the other end of the clevis and is coupled to the primary pedal for operating the clutch associated with the primary pedal. An auxiliary pedal is coupled to move the clevis for non-pivoting translational link movement so that depression of the auxiliary pedal prevents de-clutching. Stated another way, even though the primary pedal is depressed and would thereby normally rotate the link to de-clutch, translational link movement (by depressing the auxiliary pedal) prevents link rotation and de-clutching.

In a highly preferred embodiment, the primary pedal also operates a brake and translational link movement prevents clutch disengagement notwithstanding brake application. In that way, the vehicle operator can drive through the brakes for "powered retardation" or can stop the vehicle completely without de-clutching.

In applications having two driven members, e.g., tracks, the system has plural primary (left and right) pedals, each operating the separate clutch and brake functions for each track. The auxiliary pedal is a center pedal between the primary pedals and has means for depressing the primary pedals. The depressing means includes a tang attached to and extending from each primary pedal and overlapping the auxiliary pedal. Depressing the auxiliary pedal with one foot simultaneously depresses the primary pedals. As used herein, "overlapping" means at least partially coextensive with. In the specific embodiment described below, the tangs are partially coextensive with the underside of the auxiliary pedal.

Each brake operates over a range of travel of its primary pedal. In other words, light braking starts at, say, 0.75 inches of pedal travel and becomes progressively more "firm" until full braking after a few inches of pedal travel. Such pedal/braking relationship is similar to that of an automobile. The system includes a mechanism for adjusting the range with respect to primary pedal travel. By mechanism adjustment, one may select (within relatively narrow limits) the amount of initial pedal travel before light braking starts. The system includes a brake valve connected to a primary pedal by a linkage. A preferred adjusting mechanism includes a threaded rod such as a bolt for changing the effective length of the linkage.

When the improved system is installed in a crawler tractor having a transmission and left and right tracks, the system preferably includes a separate primary pedal associated with each track. The auxiliary pedal is mounted between the primary pedals. Depression solely of a primary pedal (or both such pedals) de-clutches its associated track from the transmission. Depending upon how the adjustment mechanism is set, such de-clutching follows, leads or is substantially simultaneous with the start of braking. However, simultaneous depression of all pedals, including the auxiliary pedal, brakes both tracks while preventing de-clutching. Further details of the invention are set forth in the following detailed description and the drawing.

DETAILED DESCRIPTION OF THE PREFERRED EMBODIMENTS

Figure 1:
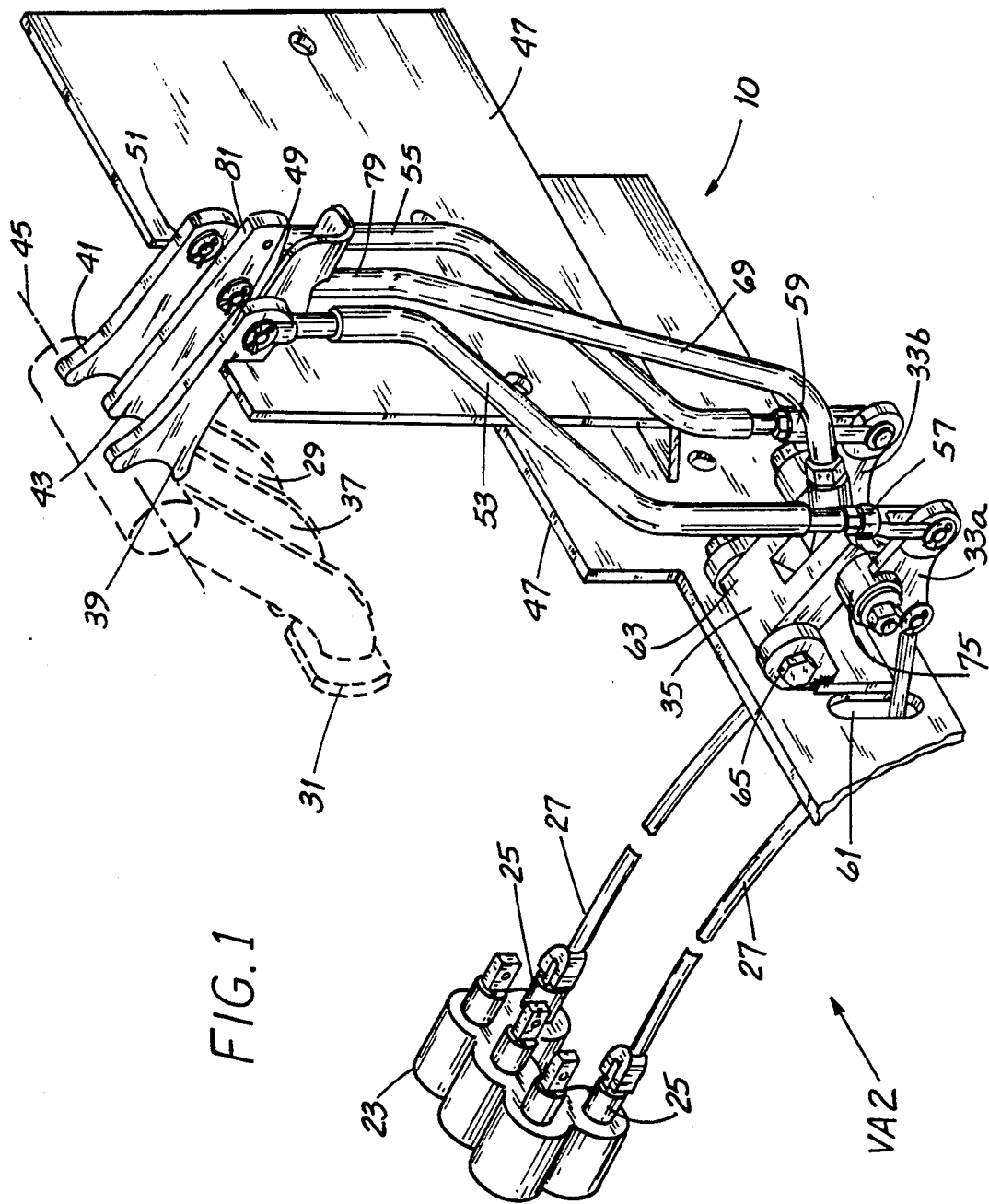
FIG. 1 is a perspective view of pedal-clutch valve linkages shown with pedals in repose (non-depressed) position, with some parts broken away and with other parts in dashed outline.
Figure 2:
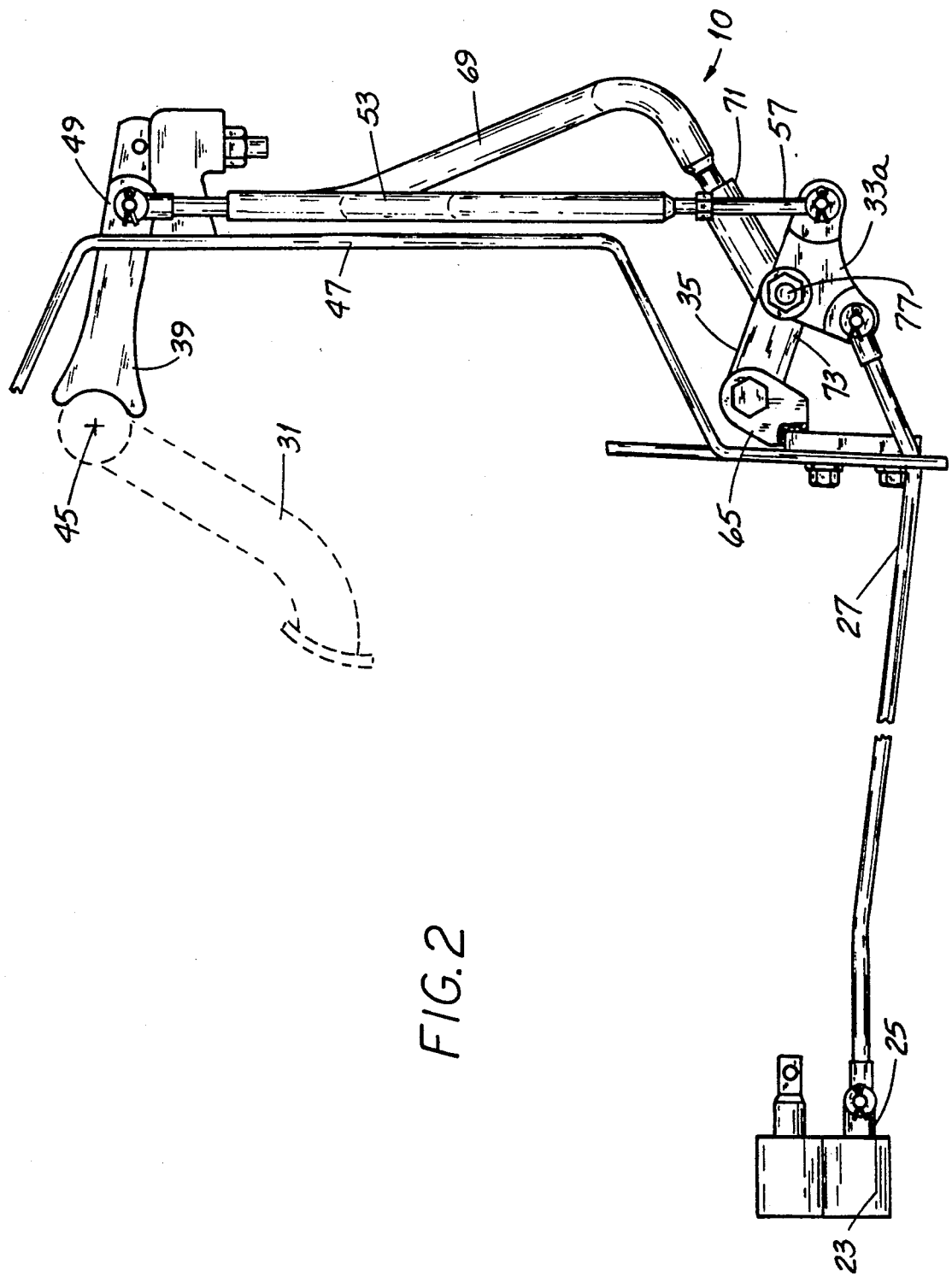
FIG. 2 is a side elevation view of the arrangement of FIG. 1, taken along the viewing axis VA2.
Figure 8:
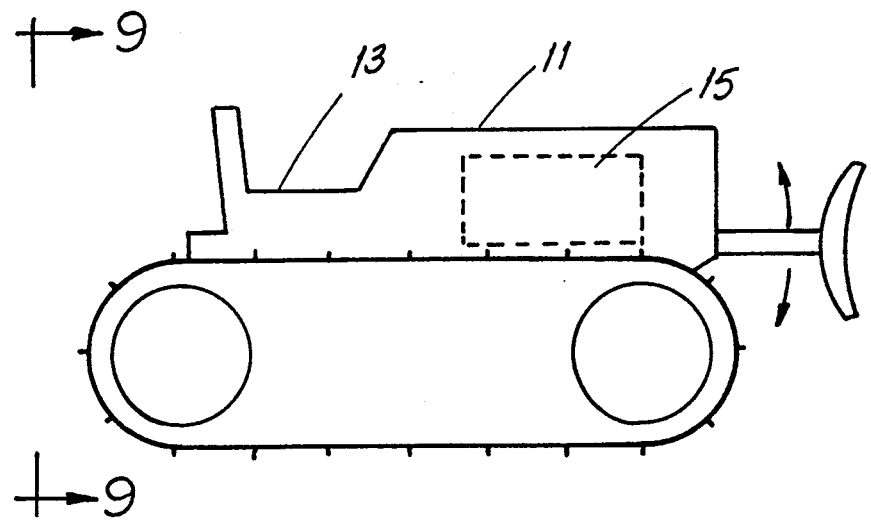
FIG. 8 is a simplified, representative side elevation view, with parts shown in dashed outline, of a type of vehicle, i.e., a crawler tractor, on which the invention may be used.
Figure 9:
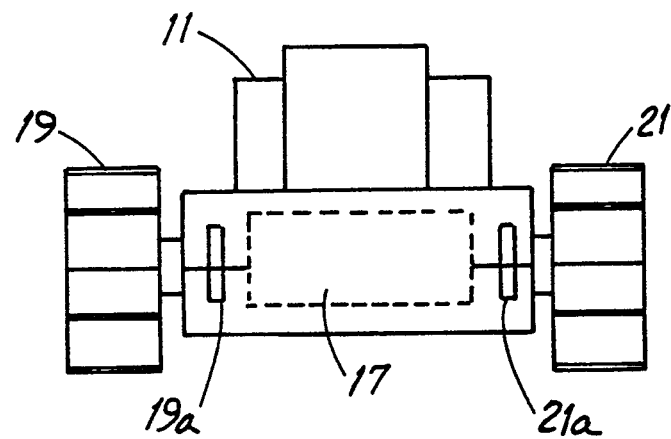
FIG. 9 is an end elevation view of the tractor of FIG. 8 taken generally along the viewing plane 9—9 thereof.

Before describing the invention 10, readers will find it helpful to understand a type of machine on which it may be used. FIGS. 8 and 9 show a crawler tractor 11 including an operator's seat/compartment 13 and an engine 15. The engine 15 is coupled through a "dual path" torque converter transmission 17 to each crawler track 19, 21 and has two clutches 19a, 21a, one for each track. As shown in FIGS. 1 and 2, each clutch 19a, 21a is engaged or disengaged by a separate clutch/de-clutch valve 23. This valve 23 has a separate movable spool 25 for each clutch 19a, 21a and both spools 25 are in a common housing. Each spool 25 is operated mechanically by "push-pull" rods 27 and rod movement to the right as shown in FIG. 2 (or down and right in the view of FIG. 1) de-clutches the transmission 17 from the associated track 19 or 21.

If, for example, the right track 21 is de-clutched, the left track 19 continues to drive and the tractor 11 turns in a circle. In a conventional arrangement (and assuming it is on a sufficiently steep grade to overcome machine friction), the tractor 11 coasts if both tracks 19, 21 are de-clutched prior to the start of braking and if the pedals 29, 31 are held at the "de-clutch/no brake" position.

Briefly described, the improved system 10 has a pivot-mounted bellcrank link 33a or 33b through which force exerted on a primary pedal 29 or 31 is applied to declutch the transmission 17 from a track 19 or 21. A link 33a or 33b (which is required to "swing" or pivot during declutching) is on a hinge-mounted clevis 35 coupled to an auxiliary pedal 37. If the auxiliary pedal 37 is depressed, the clevis 35 moves to impart translational movement to the links 33a, 33b. In that way, the links 33a, 33b is prevented from pivoting and de-clutching is also thereby prevented.

Referring to FIGS. 1 and 2, the improved system 10 includes a right support arm 39, a left support arm 41 and a center support arm 43, each having its proximal end rigidly attached to separate, corresponding pedals 31, 29, 37, respectively. For purposes of explanation, pedals 39 and 41 are individually or collectively referred to as primary pedal(s) or as right or left pedals. Pedal 43 is referred to as an auxiliary pedal or the center pedal.

The pedals 31, 29, 37 are mounted for pivoting movement about a pedal axis 45 and such pedals 31, 29, 37 and axis 45 are in the operator's compartment 13 for easy pedal access. Each arm 39, 41, 43 extends through the vehicle firewall 47. At their outer ends 49 and 51, respectively, the arms 39, 41 are pinned for pivoting movement to the right and left operating stems 53, 55, respectively. Such adjustable stems 53, 55 extend downwardly generally along the engine side of the firewall 47 and at their lower ends 57 and 59, 25 respectively, are pivotably coupled to an extending leg of "swinging" links 33a, 33b, respectively. Each of the other extending legs is pivotably coupled to the proximal end of the de-clutch rod 27. In the disclosed embodiment, the rods 27 pass through slit-like openings 61 in the firewall 47 and their distal ends are connected to corresponding clutch/de-clutch spools 25.

The "U" shaped clevis 35 has its proximal end 63 pinned to a mounting bracket 65 for pivoting clevis movement. The bracket 65 is rigidly attached to the firewall 47 by welding or bolts, for example. The links 33a, 33b are pivotably mounted at either side of the distal end 67 of the clevis 35 and an auxiliary stem 69 has its distal end 71 pivot connected between the clevis arms 73. From the foregoing, it can be seen that the apexes 75 of each link 33a, 33b and the distal end 71 of the stem 69 may be conveniently pinned by a common through-bolt 77. The proximal end 79 of the center stem 69 is pinned for pivoting movement to the extended distal end 81 of the support arm 43, movement of which is controlled by the auxiliary pedal 37.

Figure 3:
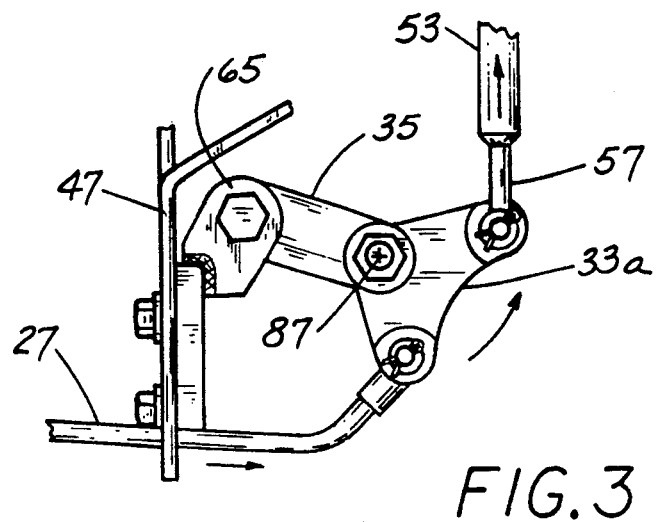
FIG. 3 is a side elevation view of a portion of the arrangement of FIG. 2, with parts broken away, showing de-clutching by rotation of a triangular link when the right brake pedal is depressed but the center auxiliary pedal is in repose position.

Considering FIGS. 1, 2, 3, it will be appreciated that the primary pedals 29, 31 are connected to their respective clutch/de-clutch valves 23 through linkage. FIG. 2 depicts the system 10 in the drive position as when both tracks 19, 21 are driving to move the tractor 11. None of the pedals 31, 29, 37, are depressed. FIG. 3 shows the positions of certain parts when the right-side primary pedal 31 is depressed to de-clutch. Assuming the clevis 35 is stationary in the position shown (as is the case when the auxiliary pedal 37 is not in use), it will also be appreciated that depression of primary pedal 31 will lift stem 53, rotate link 33a counterclockwise, move rod 27 to the right and cause the related de-clutch spool 25 to move to the right. The right track 21 is thereby disconnected from the transmission 17. And, of course, depression of the left pedal 29 similarly de-clutches the left track 19. An explanation is set out below as to the operation of the system 10 when all pedals 29, 31, 37 are operated simultaneously.

Figure 7:
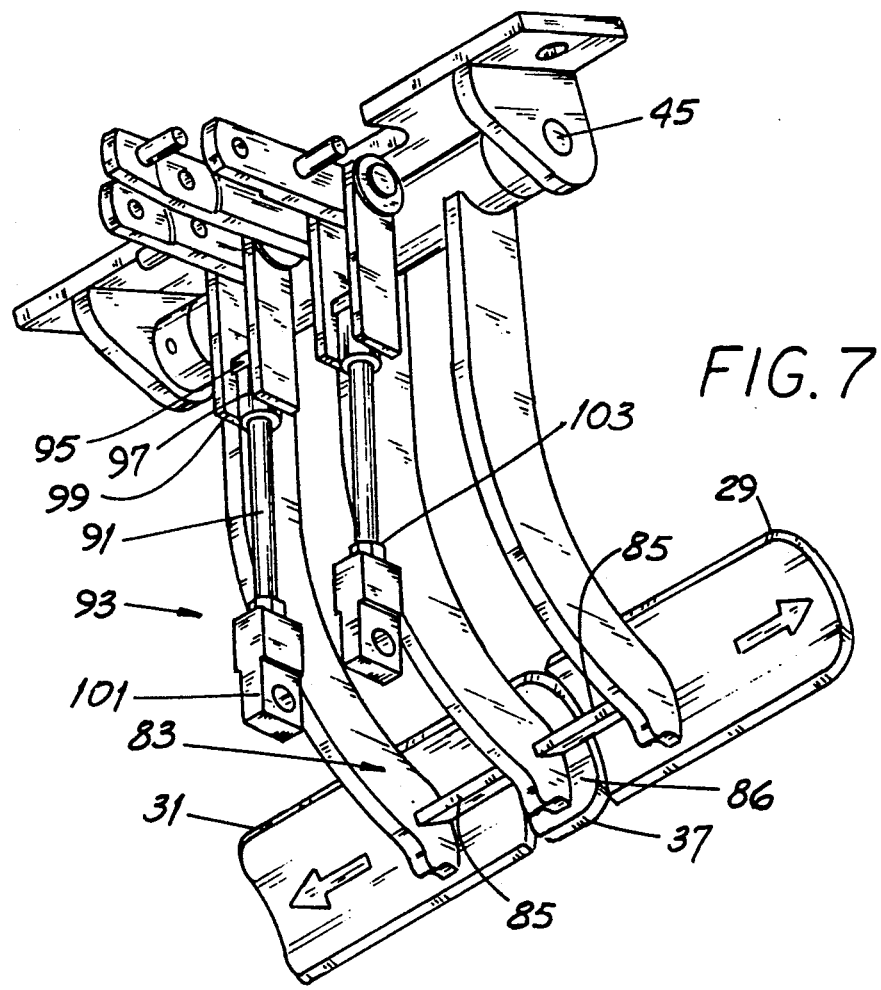
FIG. 7 is a perspective view of pedals and certain linkages taken from a vantage point near the rear of the pedals.

A highly preferred system 10 includes means 83 for depressing the primary pedals 29, 31 when the auxiliary pedal 37 is depressed. Such an arrangement permits "one foot" operation of all pedals 29,31, 37 when three-pedal operation is required to brake the vehicle while avoiding de-clutching. As depicted in FIG. 7, a tang 85 is rigidly attached to the underside of each primary pedal 29, 31 and extends inward toward the auxiliary pedal 37 to overlap with the under surface 86 of such pedal 37. However, neither tang 85 is attached to such pedal 37. Either or both of the pedals 29, 31 may be depressed without moving the auxiliary pedal 37. However, depressing the auxiliary pedal 37 causes such pedal to bear against the tangs 85 and "carry along" the pedals 29, 31. In other words, depressing the auxiliary pedal 37 causes all three pedals 29, 31, 37 to operate simultaneously.

Figure 4:
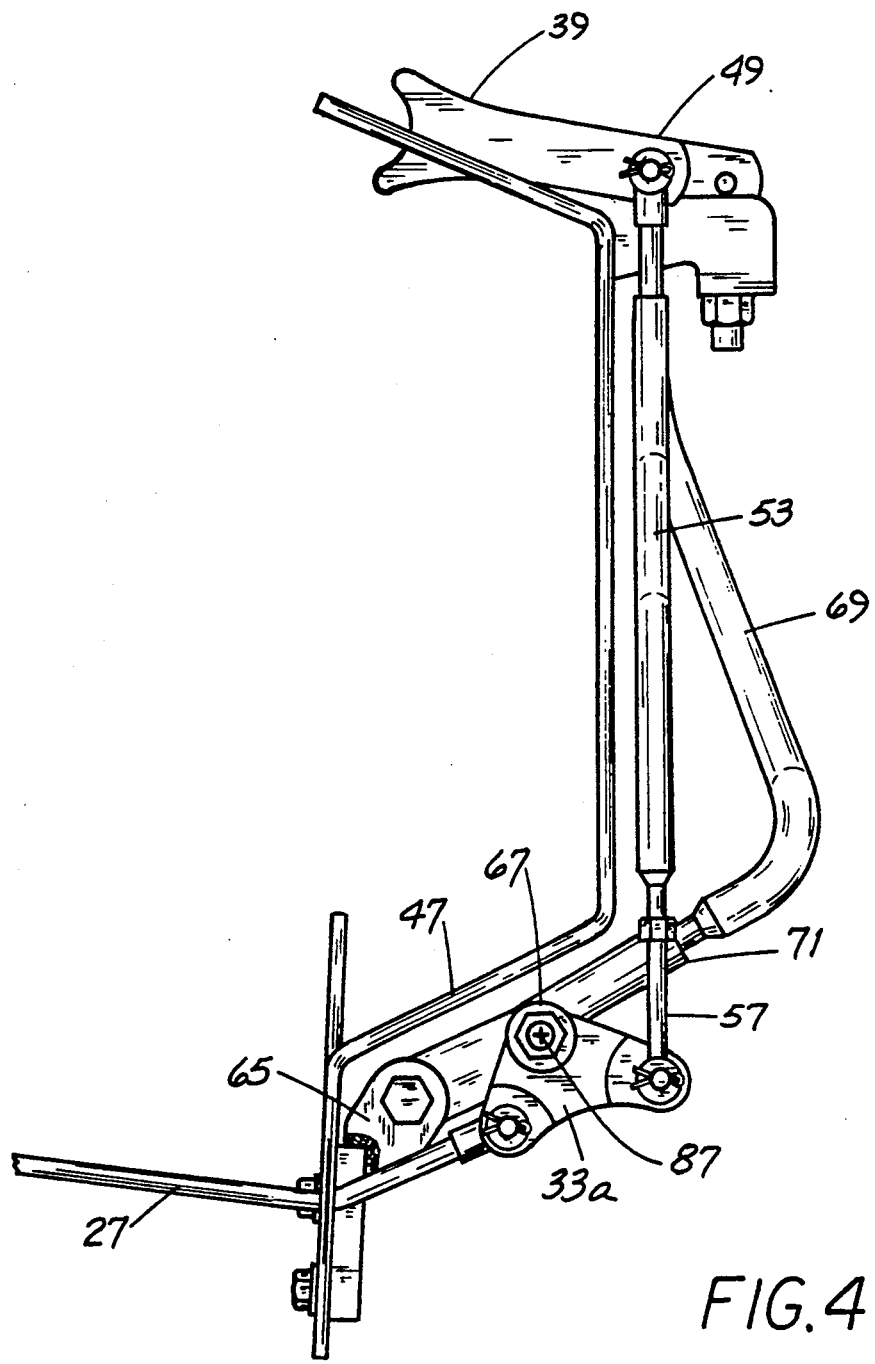
FIG. 4 is a side elevation view of a portion of the arrangement of FIGS. 1 and 2, with parts broken away, taken generally from the same perspective as that of FIG. 2, showing the position of the triangular link and clevis when the right primary pedal and the auxiliary pedal are simultaneously depressed.
Figure 6:
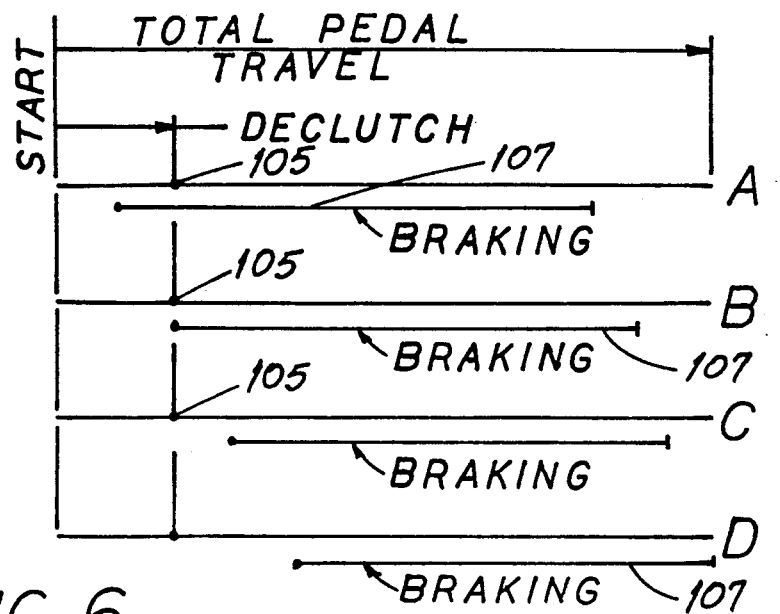
FIGS. 6A-6D are graphic depiction showing how the adjusting mechanism of FIG. 5 can affect the relationship between pedal travel and the range (from light braking to full "lock-up") of brake application.

FIGS. 1 and 4 illustrate what happens to the links 33a, 33b and clevis 35 during such simultaneous operation. By virtue of movement of the pedal 37, the center support arm 43 pivots counterclockwise, moving stem 69 upward. The clevis 35 thereby pivots counterclockwise and translates the position of the link pivot axis 87 upward by a dimension generally equal to the distance moved by the distal end 57 of the stem 53. Such translational link movement prevents link pivoting and, consequently, prevents de-clutching. To put it another way, the link 33a, 33b is able to rotate through an arc (and operate the de-clutch valve) only if the distal end 57 or 59 of the stem 53, 55 moves relative to the pivot axis 87—and clevis pivoting prevents such relative movement.

Figure 5:
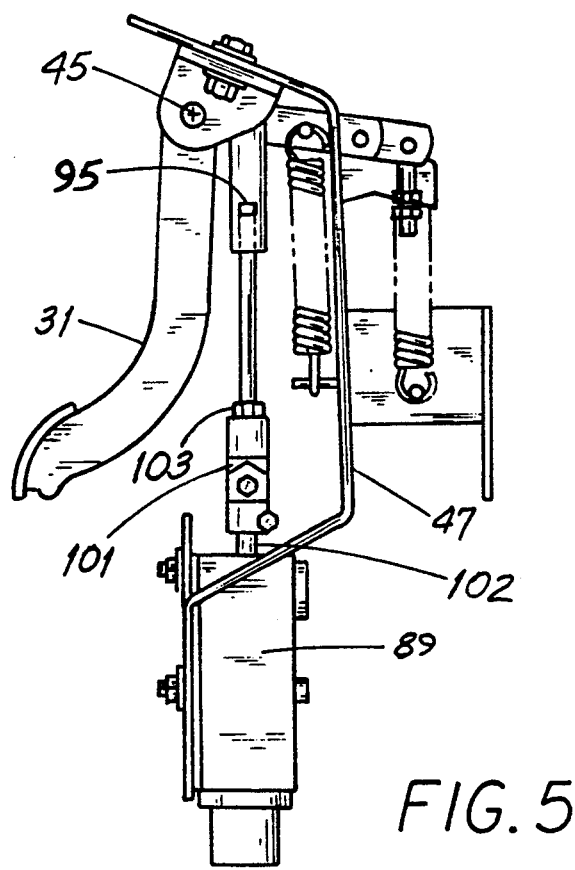
FIG. 5 is a side elevation view, with parts broken away and other parts in dashed outline, showing a primary pedal, the brake valve associated therewith and a mechanism for adjusting the range of brake operation relative to pedal travel.

Referring to FIGS. 5 and 7, each primary pedal 29, 31 is connected to the stem 102 of its respective brake valve 89 by a linkage 91. Absent use of the auxiliary pedal 37, each primary pedal 29, 31 does "double duty" by applying a brake to a track 19, 21 and de-clutching the track 19, 21 and the transmission 17. Like the brakes on an automobile, track braking (from very light to full lockup) occurs over a range of travel of a primary pedal 29, 31.

In another aspect, the improved system 10 incorporates a mechanism 93 to allow limited adjustment of the free pedal travel before braking starts. That is, the mechanism 93 adjusts the range with respect to primary pedal travel. Since (without auxiliary pedal movement) de-clutching occurs at a constant "point" or location along the arc of pedal movement, this adjustment feature permits braking to occur somewhat before, simultaneous with or subsequent to de-clutching.

FIG. 5 shows that brake valve 89 connected to the right pedal 31. A similar brake valve 89 (not shown) is connected to the left pedal 29. In a highly preferred embodiment, the adjustment mechanism 93 includes a square head bolt 95, the effective length of which can be changed in the following way.

Referring particularly to FIG. 7, the bolt 95 extends through a linkage bushing 97 secured between two plates 99. Such plates 99 are spaced by a dimension only slightly greater than the dimension of the bolt head across the flats. Such construction prevents the bolt 95 from rotating in the bushing. A tongue 101 is threaded to the lower end of the bolt 95 for connection to a brake valve 89. To change the effective length of the mechanism 93, the jam nut 103 is loosened, the bolt 95 or the stem of the valve 89 are rotated with respect to one another and the jam nut 103 tightened.

FIGS. 6A–6D illustrate how adjustment of the effective length of the bolt 95 affects the amount of pedal travel necessary for brake application. De-clutching is shown to occur at a particular point 105 along the arc of pedal travel. In the illustrated specific embodiment, increasing the effective length of the bolt 95 progressively "shifts" the braking range 107 to start later during pedal travel. For the shortest effective length of the mechanism 93, braking starts before de-clutching occurs, as illustrated by trace A. As the effective length of the bolt 95 is progressively increased, braking starts and proceeds as illustrated by traces B, C or D. From the foregoing, it is to be appreciated that braking can be adjusted to start before, simultaneously with or after de-clutching.

It is also to be appreciated that de-clutching as represented in the FIGURES occurs relatively quickly once a spool reaches the de-clutch position. Sometimes this is referred to as "bang-bang" operation. In other configurations, de-clutching occurs over a continuum and the clutch can be "feathered" or slipped like that of an automobile with a manual transmission. After understanding the foregoing, persons of ordinary skill in the art will readily understand how the invention can be adapted to such clutch arrangements.

While the principles of this invention have been described in connection with specific embodiments, it should be understood clearly that these descriptions are made only by way of example and are not intended to limit the scope of the invention.

What is claimed is:

1. In a vehicular clutch and brake control system of the type having at least one primary pedal mounted for movement between a repose position and a depressed position for operating a clutch, the improvement comprising:

clevis having an end hinge-mounted to the vehicle and including a link pivotably mounted on the clevis and coupled to the primary pedal;

an auxiliary pedal coupled to the clevis, the auxiliary pedal being mounted for movement between a repose position and a depressed position; and, when the pedals are depressed substantially simultaneously, the clevis exhibits pivoting movement and the link exhibits substantially translational movement, whereby de-clutching is prevented.

2. The improved system of claim 1 wherein the primary pedal also operates a brake and translational link movement prevents clutch disengagement notwithstanding brake application.

3. The improved system of claim 1 wherein:

the system has plural primary pedals including right and left pedals, each operating separate clutch and brake functions; and, the auxiliary pedal is a center pedal having means for depressing the primary pedals.

4. The system of claim 3 wherein the depressing means includes a tang attached to and extending from each primary pedal and overlapping the auxiliary pedal whereby depressing the auxiliary pedal simultaneously depresses the primary pedals.

5. The system of claim 1 wherein a brake operates over a range of travel of a primary pedal and the system includes a mechanism for adjusting the range with respect to primary pedal travel.

6. The system of claim 5 including a brake valve connected to a primary pedal by a linkage and the adjusting mechanism is a threaded rod for changing the effective length of the linkage.

7. The system of claim 1 installed in a crawler tractor having a transmission and left and right tracks and the system includes:

a separate primary pedal associated with each track; and, wherein:

the auxiliary pedal is between the primary pedals;

depression solely of a primary pedal de-clutches its associated track from the transmission; and, simultaneous depression of all pedals brakes both tracks while preventing de-clutching.

8. The system of claim 7 wherein depression solely of a primary pedal brakes its associated track following de-clutching.

* * * * *